US007404615B2

(12) United States Patent
Tokuno et al.

(10) Patent No.: US 7,404,615 B2
(45) Date of Patent: Jul. 29, 2008

(54) MAINTENANCE AND RECOVERY DEVICE OF A LIQUID DISCHARGE APPARATUS AND AN IMAGE FORMING APPARATUS

(75) Inventors: Toshiroh Tokuno, Hyogo (JP); Toshitaka Osanai, Kanagawa (JP); Kunihiro Uotani, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 169 days.

(21) Appl. No.: 10/555,456

(22) PCT Filed: Mar. 24, 2005

(86) PCT No.: PCT/JP2005/006203

§ 371 (c)(1), (2), (4) Date: Nov. 4, 2005

(87) PCT Pub. No.: WO2005/092627

PCT Pub. Date: Oct. 6, 2005

(65) Prior Publication Data

US 2007/0052750 A1 Mar. 8, 2007

(30) Foreign Application Priority Data

Mar. 25, 2004 (JP) ............................ 2004-089624

(51) Int. Cl.
*B41J 2/165* (2006.01)
*G01D 11/00* (2006.01)

(52) U.S. Cl. ............................ 347/29; 347/30; 347/100

(58) Field of Classification Search .................. 347/29, 347/30, 45, 100
See application file for complete search history.

(56) References Cited

U.S. PATENT DOCUMENTS

| | | | | |
|---|---|---|---|---|
| 4,597,794 | A * | 7/1986 | Ohta et al. | 347/100 |
| 6,435,665 | B2 * | 8/2002 | Lerat et al. | 347/54 |
| 6,481,826 | B1 | 11/2002 | Hara et al. | |
| 6,695,443 | B2 | 2/2004 | Arita et al. | |
| 6,846,076 | B2 * | 1/2005 | Li | 347/105 |
| 2003/0107632 | A1 | 6/2003 | Arita et al. | |

FOREIGN PATENT DOCUMENTS

| | | |
|---|---|---|
| JP | 6-238915 | 8/1994 |
| JP | 3106783 | 9/2000 |
| JP | 2000-351931 | 12/2000 |
| JP | 2001-71514 | 3/2001 |
| JP | 2001-254037 | 9/2001 |
| JP | 2002-12802 | 1/2002 |

(Continued)

*Primary Examiner*—Shih-Wen Hsieh
(74) *Attorney, Agent, or Firm*—Cooper & Dunham, LLP

(57) ABSTRACT

A maintenance and recovery device of a liquid droplet discharge apparatus improves a performance of discharging droplets of a liquid having a high-viscosity. A liquid droplet discharge head (34) discharges droplets of a recording liquid from a nozzle. A suction cap member (92*a*) caps a nozzle plane of the liquid droplet discharge head (34). An inclined surface (191) provides a slope toward an evacuation port (194) on a bottom of the suction cap member (92*a*). The inclined surface (191) forms an inclination angle with respect to a horizontal plane. The inclined surface is formed of a material having a contact angle with respect to the recording liquid. A sum of the inclination angle and the contact angle is equal to or larger than 70 degrees.

6 Claims, 8 Drawing Sheets

FOREIGN PATENT DOCUMENTS

| | | |
|---|---|---|
| JP | 2002-19096 | 1/2002 |
| JP | 2002-88291 | 3/2002 |
| JP | 2002-211106 | 7/2002 |
| JP | 2002-256180 | 9/2002 |
| JP | 2003-1839 | 1/2003 |
| JP | 2003-20425 | 1/2003 |
| JP | 2003-20426 | 1/2003 |
| JP | 2003-20428 | 1/2003 |
| JP | 2003-96355 | 4/2003 |
| JP | 2003-147243 | 5/2003 |
| JP | 2003-201429 | 7/2003 |
| JP | 2003-213179 | 7/2003 |
| JP | 2003-226827 | 8/2003 |

* cited by examiner

MAINTENANCE AND RECOVERY DEVICE OF A LIQUID DISCHARGE APPARATUS AND AN IMAGE FORMING APPARATUS

TECHNICAL FIELD

The present invention generally relates to image forming apparatuses and, more particularly, to a maintenance and recovery device of a liquid discharge apparatus, which discharges droplets of a recording liquid to form an image and an image forming apparatus equipped with such a maintenance and recovery device.

BACKGROUND ART

There is a liquid discharge apparatus equipped with a recording head having a liquid droplet discharge head which discharges droplets of a recording liquid, which is used in various image forming apparatuses such as a printer, a facsimile machine, a copy machine, a combination machine, etc.

In such an image forming apparatus, it is very important to maintain and recover a performance of a recording head that discharges a recording liquid. A maintenance and recovery device performs such a maintenance and recovery of a recording head. Generally, such a maintenance and recovery device comprises a moisture retention cap, a suction cap, a wiper blade and a blank discharge receiver for receiving liquid droplets of a blank or blank discharge that does not contribute to image formation.

As a cap member in such a maintenance and recovery device, there is known, as disclosed in Japanese Patent Publication No. 3106783, a cap that has a first inclined surface, which inclines toward an ink discharge port with a gentle slope, and a second inclined surface, which inclines toward the ink discharge port with a steep slope so as to eliminate ink remaining in the vicinity of the ink discharge port.

Additionally, there is known, as disclosed in Japanese Laid-Open Patent Application No. 2001-71514, a cap that has a space part of a tapered shape, which continuously narrows toward an ink discharge port and provided with an ink retaining means in a passage that connects an ink suction port to a negative pressure generating means so as to discharge ink inside the space part to maintain moisture retention by ink in the passage.

Further, there is known, as disclosed in Japanese Laid-Open Patent Application No. 6-23891, a cap that facilitates suction of ink by improving water repellency of an inner surface of the cap.

Additionally, there is known, as disclosed in Japanese Laid-Open Patent Application No. 2003-1839, a cap that improves airtightness by being provided with a resilient seal member covering a nozzle plane and a rigid member forming a sealing part, these members being formed by materials having water repellency of a contact angle equal to or greater than 90° with respect to ink.

As a colorant of ink used for an inkjet recording apparatus as an image forming apparatus, dye ink was a main stream at the beginning in viewpoint of a merit of its coloring nature and reliability. However, in recent years, pigment ink using a pigment such as a carbon black tends to be used so as to provide light resistance and water resistance to a recorded image. Moreover, there is a tendency to set a high viscosity to ink for the purpose of increasing a degree of freedom of ink prescription and preventing blur of ink after an ink droplet landed a regular paper.

Such a high viscosity pigment ink changes in its viscosity due to a change in temperature. For example, ink having a viscosity of 8 cps at an ambient temperature of 22° C. may have a viscosity of more than 15 cps at 10° C. and a viscosity of about 5 cps at 32° C. It was found according to experiments by the inventors that, when such ink is suctioned by a conventional cap member, it is difficult to discharge the ink stably.

That is, it was found that the cap member, which is disclosed in Japanese Patent Publication No. 3106783, having a first inclined surface, which inclines toward an ink discharge port with a gentle slope, and a second inclined surface, which inclines toward the ink discharge port with a steep slope, can reduce a residual amount of ink, but, discharge of the ink is not sufficient when pigment ink, especially ink having a viscosity of equal to or higher than 5 cps, is used.

It was also found that the cap member disclosed in Japanese Laid-Open Patent Application No. 2001-71514 cannot sufficiently discharge ink when pigment ink, especially ink having a viscosity of equal to or higher than 5 cps, is used.

Moreover, it was found that the cap member disclosed in Japanese Laid-Open Patent Application No. 6-23891 can facilitate suction of ink by improving water repellency of an inner surface of the cap, but discharge of ink is not sufficient when ink containing pigment, especially ink having a viscosity of 5 cps and a surface tension equal to or smaller than 40 dyne/cm is used since wetability of the ink is extremely high even the water repellent treatment is applied.

Moreover, it was found that the cap member disclosed in Japanese Laid-Open Patent Application No. 2003-1839, which is provided with a resilient seal member covering a nozzle plane and a rigid member forming a sealing part that are formed by materials having water repellency of a contact angle equal to or greater than 90°, cannot be used practically when ink having a viscosity of 5 cps and a surface tension equal to or smaller than 40 dyne/cm is used since it is difficult to apply a water repellent treatment to set a contact angle with respect to the ink to be equal to or grater than 60 degrees.

DISCLOSURE OF THE INVENTION

It is a general object of the present invention to provide an improved and useful maintenance and recovery device of a liquid droplet discharge apparatus in which the above-mentioned problems are eliminated.

A more specific object of the present invention is to provide a maintenance and recovery device of a liquid droplet discharge apparatus, which improves a performance of discharging droplets of a liquid having a high-viscosity.

In order to achieve the above-mentioned objects, there is provided according to one aspect of the present invention a maintenance and recovery device of a liquid droplet discharge apparatus having a liquid droplet discharge head discharging droplets of a recording liquid from a nozzle, the maintenance and recovery device comprising: a suction cap member that caps a nozzle plane of the liquid droplet discharge head; and an inclined surface that provides a slope toward an evacuation port on a bottom of the suction cap member, the inclined surface forming an inclination angle with respect to a horizontal plane, the inclined surface being formed of a material having a contact angle with respect to the recording liquid, wherein a sum of the inclination angle and the contact angle is equal to or larger than 70 degrees.

According to the maintenance and recovery device of the present invention, since the inclined surface that inclines toward the evacuation port on the bottom portion of the cap member is provided and the sum of the inclination angle with respect to the horizontal plane and the contact angle of the material forming the inclined surface with respect to the recording liquid is set to 70 degrees, the recording liquid suctioned into the cap member tends to be led to the evacuation port by running along the inclined surface. Thus, an amount of the recording liquid remaining in the cap member can be reduced even if the recording liquid has a viscosity equal to or higher than 5 cps and a surface tension equal to or smaller than 40 dyne/cm.

In the above-mentioned maintenance and recovery device of a liquid droplet discharge apparatus according to the present invention, the sum of the inclination angle and the contact angle may be equal to or larger than 90 degrees.

In the maintenance and recovery device of a liquid droplet discharge apparatus according to the present invention, the cap member may include a portion that forms a liquid passage through which the recording liquid flows toward the discharge port, and a cross-sectional area of the liquid passage may continuously decrease from a opening part toward the evacuation port.

In the maintenance and recovery device of a liquid droplet discharge apparatus according to the present invention, the suction cap member may include a resilient member configured to be brought into contact with the nozzle plane and a bottom member having a recessed part including the inclined surface, and the resilient member and the bottom member are integrated with each other.

In the maintenance and recovery device of a liquid droplet discharge apparatus according to the present invention, a water repellent treatment may be applied at least a portion of an inner surface of the suction cap member.

Additionally, there is provided according to another aspect of the present invention an image forming apparatus comprising: a liquid droplet discharge head as a recording head having a nozzle that discharges droplets of a recording liquid; and a maintenance and recovery device that maintains and recovers a performance of the liquid droplet discharge head, wherein the maintenance and recovery device includes: a suction cap member that caps a nozzle plane of the liquid droplet discharge head; and an inclined surface that provides a slope toward an evacuation port on a bottom of the suction cap member, the inclined surface forming an inclination angle with respect to a horizontal plane, the inclined surface being formed of a material having a contact angle with respect to the recording liquid, wherein a sum of the inclination angle and the contact angle is equal to or larger than 70 degrees.

According to the image forming apparatus of the present invention, since the maintenance and recovery device is provided to the liquid discharge apparatus, an amount of the recording liquid remaining in the cap member can be reduced even when performing high-quality image recording by using a recording liquid having a viscosity equal to or higher than 5 cps and a surface tension equal to or smaller than 40 dyne/cm, which prevents occurrence of image missing such as a blank part in an image due to an undischarging nozzle.

In the image forming apparatus according to the present invention the above-mentioned invention, the recording liquid may contain water, pigment, a polymer component and a water-soluble organic solvent, and wherein an amount of pigment may be equal to or more than 6 weight percent of the recording liquid, and a viscosity of the recording liquid may be equal to or higher than 5 cps and equal to or lower than 20 cps and a surface tension of the recording liquid may be 40 dyne/cm at a temperature of 25° C.

In the image forming apparatus according to the present invention, the sum of the inclination angle and the contact angle may be equal to or larger than 90 degrees.

In the image forming apparatus according to the present invention, the cap member may include a portion that forms a liquid passage through which the recording liquid flows toward the evacuation port, and a cross-sectional area of the liquid passage may continuously decrease from an opening part toward the discharge port.

In the image forming apparatus according to the present invention, the suction cap member may include a resilient member configured to be brought into contact with the nozzle plane and a bottom member having a recessed part including the inclined surface, and the resilient member and the bottom member are integrated with each other.

In the image forming apparatus according to the present invention, a water repellent treatment may be applied at least a portion of an inner surface of the suction cap member.

Other objects, features and advantages of the present invention will become more apparent from the following detailed description when read in conjunction with the accompanying drawings.

BEST MODE FOR CARRYING OUT THE INVENTION

Figure 1:
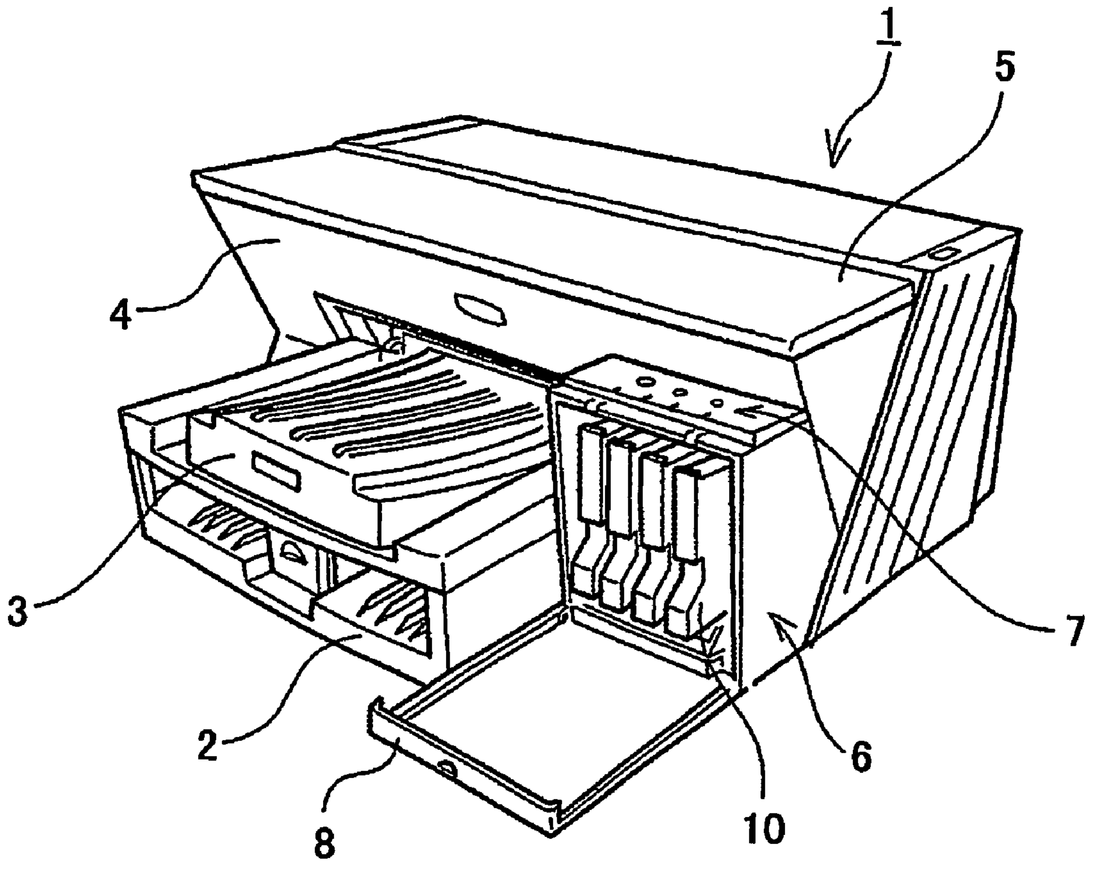
FIG. 1 is a perspective view of an image forming apparatus viewed from a front side.

A description will now be given, with reference to FIG. 1, of an image forming apparatus including a maintenance and recovery device of a liquid discharge apparatus according to the present invention. FIG. 1 is a perspective view of the image forming apparatus viewed from a front side.

The image forming apparatus shown in FIG. 1 comprises: an apparatus body 1; a paper supply tray 2 attached to the apparatus body 1 for supplying papers; a paper eject tray attached to the apparatus body for accommodating papers on which images are recorded (formed); a cartridge attaching part 6 protruding forward from a front side 4 and lower than an top side 5; and an operation part 7 such as operation keys and a display device on a top side of the cartridge attaching part 6. A main tank 10 is replaceably attached to the cartridge attaching part 6. The main tank 10 (hereinafter, referred to as an "ink cartridge") is a tank for storing a liquid as a liquid replenishing means. The cartridge attaching part 6 also has a front cover 8, which can be opened and closed.

Figure 2:
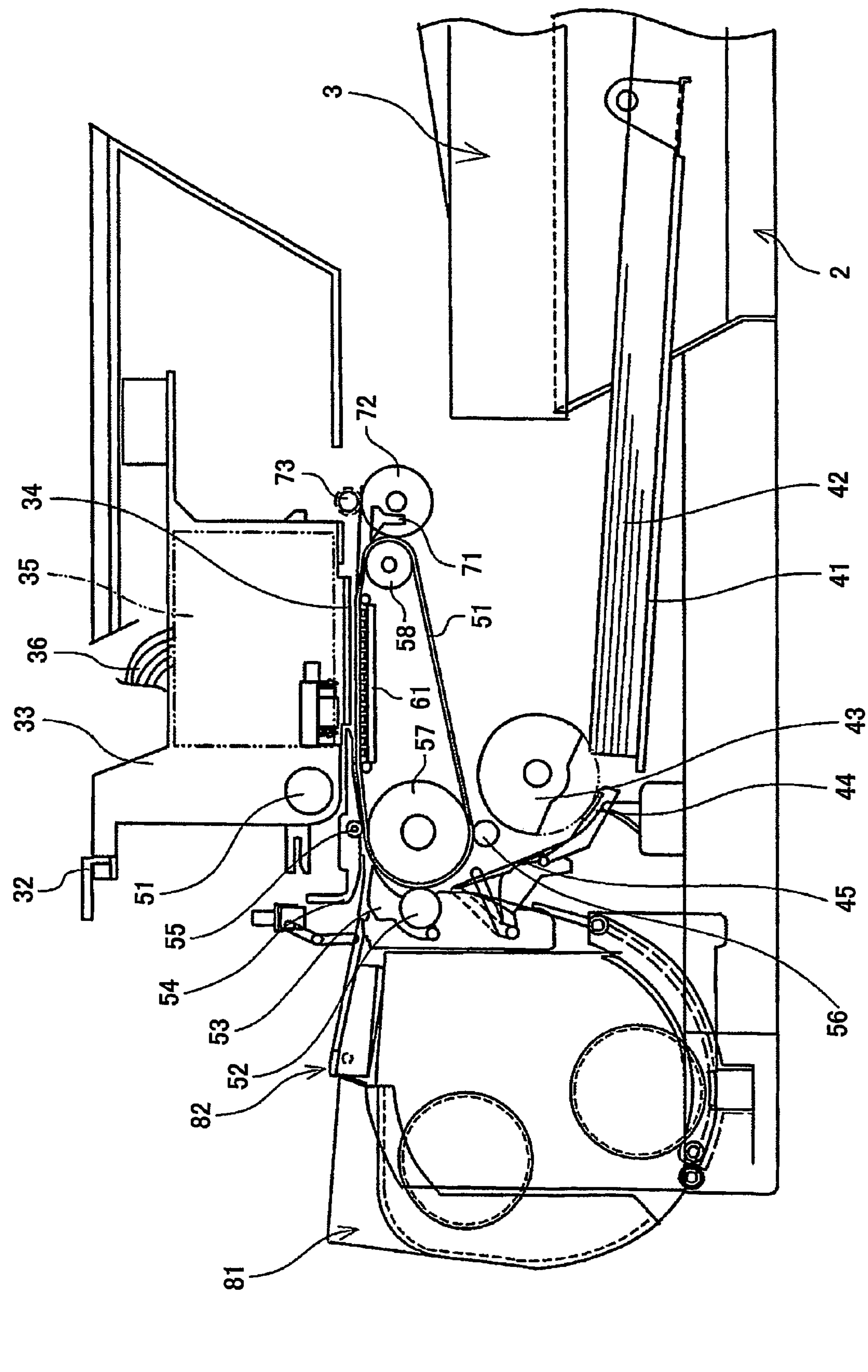
FIG. 2 is an outline structure diagram of an entire mechanical part of the image forming apparatus shown in FIG. 1.
Figure 3:
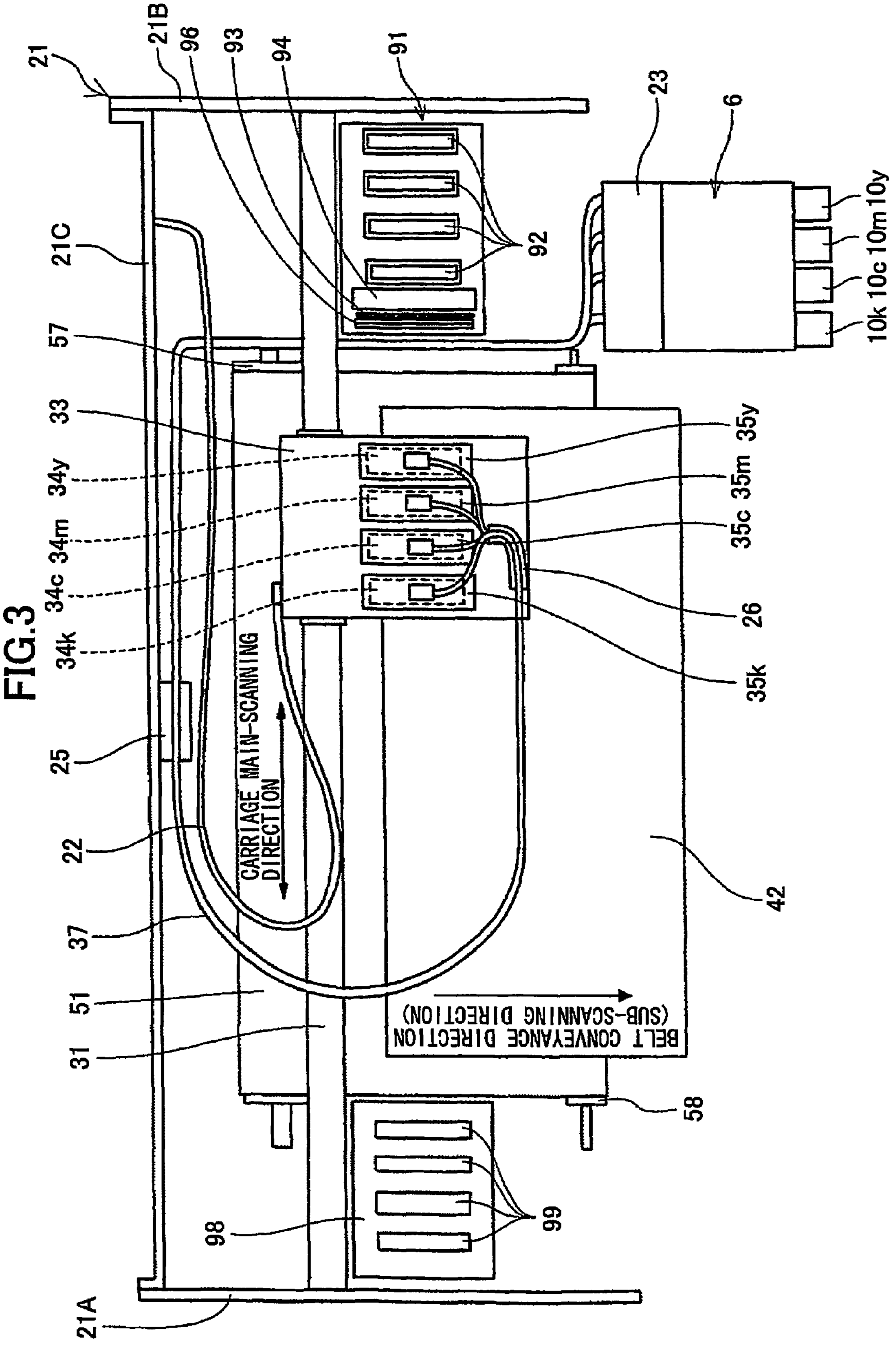
FIG. 3 is a plan view of a part of the mechanical part shown in FIG. 2.

A description will be given, with reference to FIG. 2 and FIG. 3, of a mechanical part of the image forming apparatus shown in FIG. 1. FIG. 2 is an outline structure diagram of the entire mechanical part. FIG. 3 is a plan view of a part of the mechanical part.

A carriage 33 is slidably supported by a guide rod 31 as a guide member, which bridges between left and right side-plates 21A and 21B that constitute a frame 21, and a stay 32 (shown in FIG. 2). The carriage 33 is movable by a main scanning motor (not shown in the figure) in a direction (a carriage scanning direction: a main scanning direction) indicated by arrows in FIG. 3.

Provided in the carriage 33 are a plurality of recording heads 34, which are inkjet heads as liquid droplet discharge head for discharging droplets of a recording liquid (ink droplets), with a plurality of nozzles arranged in a direction perpendicular to the main scanning direction and an ink droplet discharging direction being directed downward.

Here, the recording heads 34 consists of a recording head 34*y* which discharges liquid droplets of yellow (Y), a recording head 34*m* which discharges liquid droplets of magenta (M), a recording head 34*c* which discharges liquid droplets of cyan (C) and a recording head 34*b* which discharges liquid droplets of black (Bk). It should be noted that, the color of the heads is not distinguished when referred to as the recording heads 34. In addition, the structure of the head is not limited to that shown in the figures. For example, the head can be constituted by one or more recording heads each having one or more nozzle trains that discharges liquid droplets of one or more colors.

As the liquid droplet discharge heads constituting the recording heads 34, one having an actuator as an energy generating means can be used. Such an actuator may be a piezoelectric actuator using a piezoelectric element, a thermal actuator utilizing a phase change of a liquid due to film boiling using an electromechanical transducer such as a heat generating resistive element, a shape memory alloy actuator utilizing a metal phase change due to a temperature change, and an electrostatic actuator utilizing an electrostatic power.

Moreover, sub-tanks 35*y*, 35*m*, 35*c* and 35*k* (when not distinguishing color, referred to as "the sub tank 35") of each color are mounted on the carriage 33 for supplying the recording liquids of each color to the recording heads 34, respectively. The recording liquids are supplied from the ink cartridges 10 (when distinguishing color, referred to as "ink cartridges 10*y*, 10*m*, 10*c* and 10*k*") to the sub-tanks 35 through recording liquid supply tubes 37.

Here, the ink cartridges 10 are accommodated in the cartridge attaching part 6 as also shown in FIG. 3, and a supply pump unit 23 is provided to the cartridge attaching part 6 so as to deliver the recording liquids in the ink cartridges 10 to the dub-tanks 35 through recording liquid supply tubes 37. The recording liquid supply tubes 37 are held at a middle part by a body-side holder 25 attached to a rear plate 21 which constitutes the frame 21. The recording liquid supply tubes 37 are further fixed onto the carriage 33 by a fixing rib 26.

The mechanical part is provided with, as a paper supply part for separating and feeding papers 42 stacked on a paper placement part (bottom plate) 41 of the paper supply tray 2 one by one, a half-moon roller (paper feed roller) 43 and a separation pad 44 made of a material having a large coefficient of friction and urged toward the paper supply roller 43.

The mechanical part also includes, as a conveyance part for conveying the papers 42 supplied from the paper supply part under the recording heads 34: a conveyance belt 51 for electrostatically attaching and conveying the papers 42; a counter roller 52 for sandwiching and conveying the papers 42, which are fed from the paper supply part through a guide 45; a conveyance guide 53 for turning the papers 42 being conveyed upward by 90 degrees so as to cause the papers to move with the conveyance belt 51; and an end press roller 55 urged by a press member 54 toward the conveyance belt 51. The mechanical part further includes a charge roller 56 as a charge means for charging a surface of the conveyance belt 51.

Here, the conveyance belt 51 is an endless belt forming a loop, and is engaged with a conveyance roller 57 and a tension roller 58 so as to revolve in the belt conveyance direction shown in FIG. 3. The charge roller 56 is brought into contacted with the surface of the conveyance belt 51 and is rotated by following the movement of the conveyance belt 51 so as to apply a pressing force of 2.5 N onto each ends of the axis.

Additionally, a guide member 61 is provided on the back-side of the conveyance belt 51 at a position corresponding to a print area by the recording head 54. A top surface of the guide member 61 protrudes further toward the recording heads 34 from a tangential line of the two rollers (the conveyance roller 57 and the tension roller 58) which support the conveyance belt 51. Thereby, the conveyance belt 51 is pressed against and guided by the top surface of the guide member 61, which maintains a highly accurate flatness.

Farther, as a paper eject part for ejecting the recoding papers 42 which have been recorded by the recording heads 34, there are provided: a separation claw 51 for separating the papers 42 from the conveyance belt 51; an eject roller 72 and an eject roller 73; and the paper eject tray 3 under the eject roller 72. Here, a height of measured from a position between the eject roller 72 and the eject roller 73 to the paper eject tray 3 is set so that a large amount of papers can be accommodated in the paper eject tray 3.

Moreover, a double-side paper feed unit 81 is detachably attached to the rear side of the apparatus body 1. The double-side paper feed unit 81 takes the papers 42, which are returned by a reverse rotation of the conveyance belt 51, and turns the papers 42 upside down so as to feed the reversed papers 42 to a position between the counter roller 52 and the conveyance belt 51. Moreover, it a manual feed part 82 is provided to a top surface of the double-side feed unit 81.

Further, as shown in FIG. 3, in a non-print area on one side of the scanning direction of the carriage 33, there is provided a maintenance and recovery device 91 (hereinafter, may be referred to as a "subsystem") of a liquid discharge apparatus according to the present invention for maintaining and recovering a normal state of the nozzles of the recoding heads 34.

The subsystem comprises: cap members (hereinafter, simply referred to as caps) 92*a*-92*d* (when not distinguishing each, referred to as caps 92) for capping the nozzle planes of the recoding heads 34; a wiper blade 93 which is a blade member for wiping the nozzle plane; a blank discharge receiver 94 for receiving droplets in blank discharge for discharging liquid droplets which ejects a recording liquid having an increased viscosity and do not contribute to recording, and a wiper cleaner 95 which is a cleaner member integrally formed with the blank discharge receiver for removing a recording liquid adhering the wiper blade 93; and a cleaner roller 96 constituting a cleaner means for pressing the wiper blade 93 against the wiper cleaner 95 when cleaning the wiper blade 93.

As shown in FIG. 3, in a non-print area on the other side of the carriage with respect to the scanning direction, a blank discharge receiver 98 is provided for discharging liquid droplets which do not contribute to recording so as to eject a recording liquid having an increased viscosity. The blank discharge receiver 98 is provided with openings 99 arranged along a direction of the train of nozzles of the recording heads 34.

In the thus-constructed image forming apparatus (inkjet recording apparatus), the papers 42 are separated and fed from the paper supply tray one sheet by one sheet; the papers conveyed in a substantially upward direction is guided by the guide 45; the papers 42 are conveyed by being sandwiched between the conveyance belt 51 and counter roller 52, leading ends of the papers 42 are guided by the conveyance guide 53 and pressed against the conveyance belt 51 by the end press roller 55; and the conveyance direction is changed by about 90 degrees.

At this time, an alternating voltage, that is, a plus output and a minus output are repeatedly and alternately applied from a high-voltage power source to the charge roller 56 by a control circuit (not shown in the figure), which results in the conveyance belt being charged in an alternating voltage pattern, that is, a pattern of a plus and a minus each having a predetermined width in the sub-scanning direction which is the direction of revolving movement of the conveyance belt 51. When the paper 42 is supplied onto the thus charged conveyance belt 51, the paper 42 is electrostatically attracted by the conveyance belt 51 and is conveyed by the revolving movement of the conveyance belt 51 in the sub-scanning direction.

Thus, by driving the recoding heads 34 in accordance with an image signal while moving the carriage 33, recording for one line is performed by discharging liquid (ink) droplets onto the stopped paper 42, and recording for a next line is performed after moving the paper 42 by a predetermined distance. Upon receipt of a recording end signal or a signal which indicates that a trailing edge of the paper 42 reached the recording area, a recording operation is ended and the paper 42 is ejected onto the paper eject tray 3.

Additionally, the carriage 33 is moved to the side of the sub-system 91 in a standby state of printing (recording) so that the recording heads 34 are capped by the cap members 92, which maintains the nozzles in a wet state to prevent a discharge failure due to dried ink. Additionally, a recording liquid is suctioned from the nozzles in a state where the recording heads 34 are capped by the cap members 92 (this action is referred to as “nozzle suction” or “head suction”) so as to perform a recovery operation which evacuates a recording liquid having an increased viscosity or bubbles. Further, a blank discharge operation is performed to discharge a liquid (ink), which does not relate to recording, before start of recording or during recording. Thus, a stable discharge characteristic of the recording heads 34 is maintained.

Figure 4:
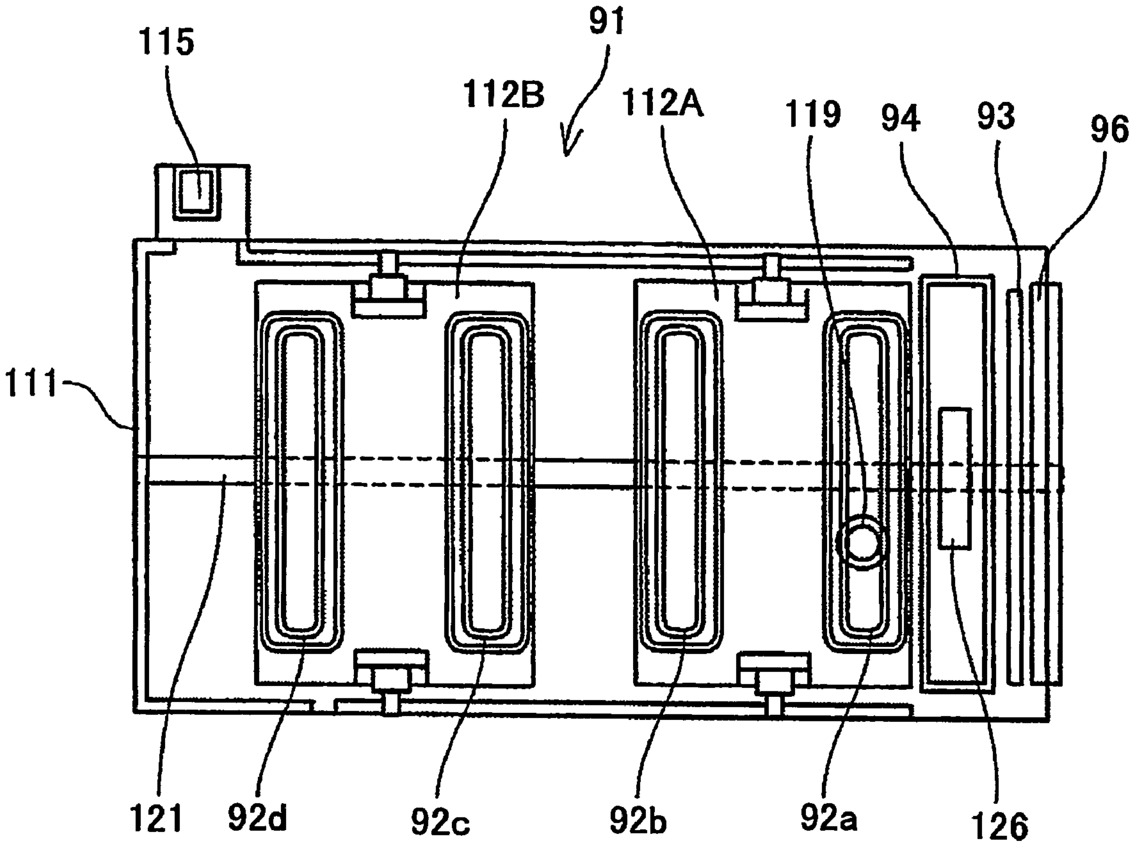
FIG. 4 is a plan view of a subsystem serving as a maintenance and recovery device.
Figure 5:
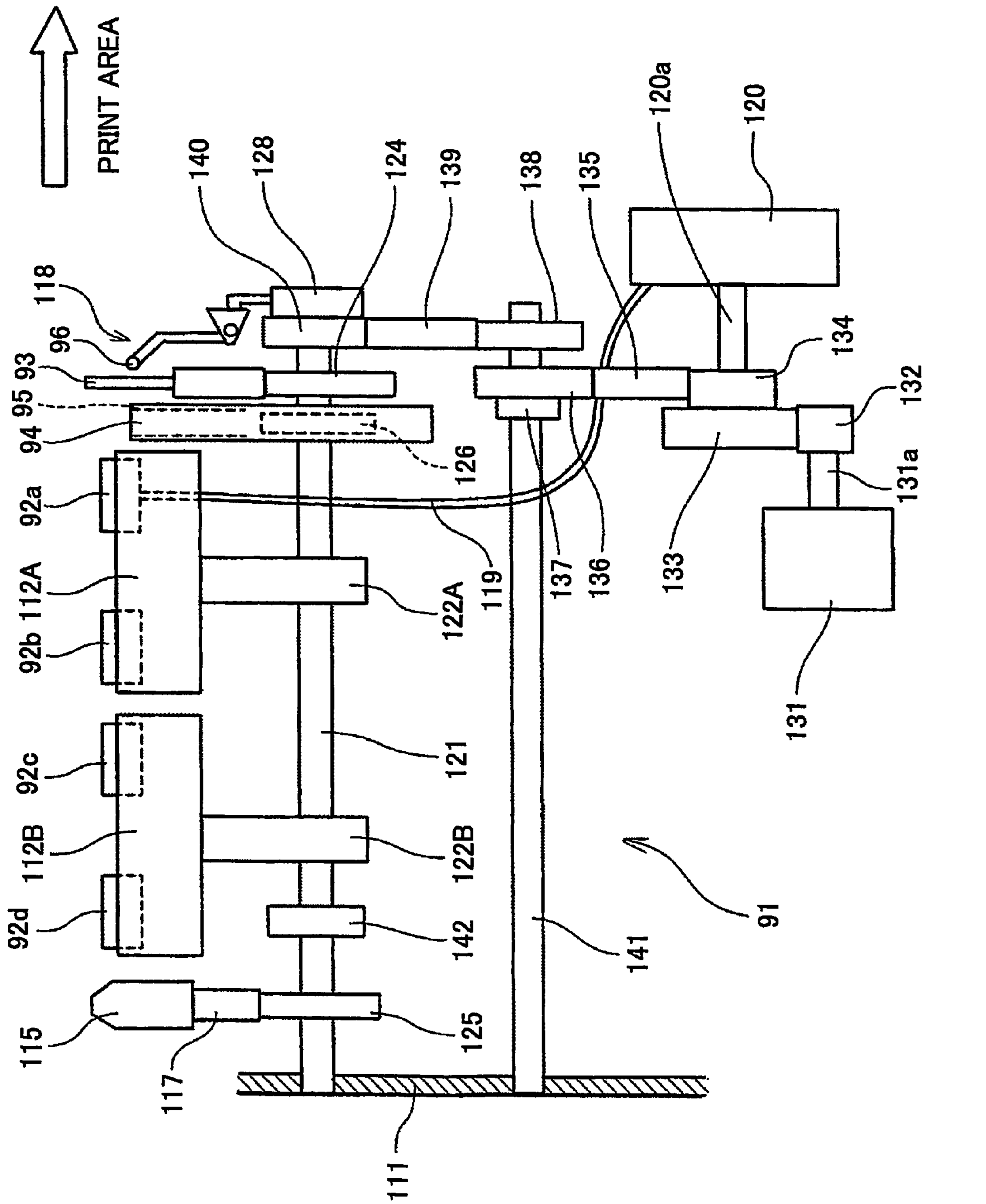
FIG. 5 is an illustrative structure diagram of the subsystem shown in FIG. 4.
Figure 6:
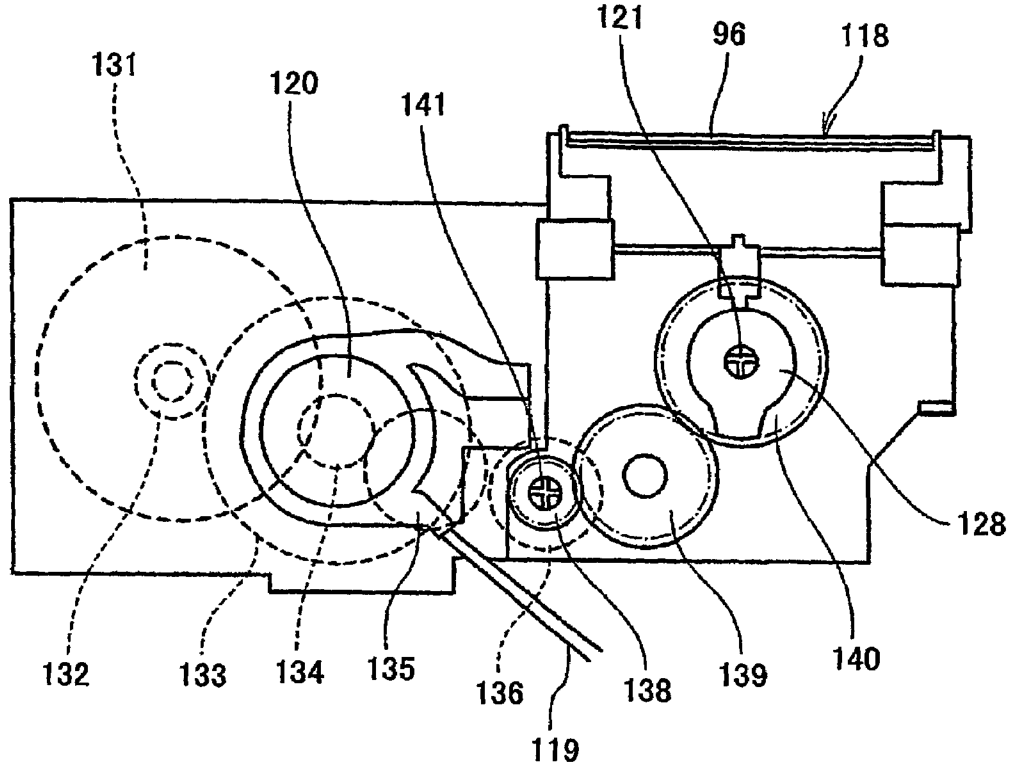
FIG. 6 is a side view of the subsystem shown in FIG. 4.

A description will now be given, wither reference to FIG. 4 through FIG. 6, of an outline of the subsystem 91 which includes the maintenance and recovery device in the image forming apparatus according to the present invention. FIG. 4 is a plan view of the subsystem 91. FIG. 5 is an illustrative structure diagram of the subsystem 91. FIG. 6 is a side view of the subsystem 91 shown in FIG. 4.

Supported by a frame (maintenance device frame) 11 of the sub system 91 are two cap holders 112A and 112B, which are cap supporting mechanisms, the wiper blade 93 as a wiping member including a resilient material as the cleaning means, and a carriage lock 115 that are movable supported in a vertical direction (movable up and down). Additionally, the blank discharge receiver 94 is located between the wiper blade 93 and the cap holder 112A. A wiper cleaner 118 is swingably supported so as to perform cleaning of the wiper blade 93. The wiper cleaner serves as a cleaner means including a cleaner roller 96 which is a cleaning member for pressing the wiper blade 93 onto the wiper cleaner 95 as a cleaning member of the blank discharge receiver from outside the frame 111.

The cap holders 112A and 112B (may be referred to as cap holders 112 when not distinguishing from each other) support two caps 92*a* and 92*b* and another two caps 92*c* and 92*d* that caps the nozzle planes of the recording heads, respectively.

Here, a tubing pump (suction pump) 120 as a suction means is connected via a flexible tube 119 to the cap 92*a* which is supported by the cap holder 112A closest to the print area. Other caps 92*b*, 92*c* and 92*d* are not connected to the tubing pump 120. That is, only the cap 92*a* serves as a suction (recovery) and moisturizing cap (hereinafter, simply referred to as a “suction cap”), and other caps 92*b*, 92*c* and 92*d* serve as merely moisturizing caps. Therefore, when performing a recovery operation of the recording heads 34, one of the recording heads 34, which requires a recovery operation, is selectively moved to a position where it can be capped by the suction and moisturizing cap 92*a*.

A cam shaft 121 rotatably supported by the frame 111 is located under the cap holders 112A and 112B. The cam shaft 121 is provided with cap cams 122A and 122B, a wiper cam 124, a carriage lock cam 125, a roller 126, and a cleaner cam 128. The cap cams 122A and 122B moves the cap holders 112A and 112B up and down, respectively. The wiper cam moves the wiper blade 93 un and down. The carriage lock cam 125 moves the carriage lock up and down via a carriage lock arm 117. The roller 126 is a rotation member which is a blank discharge landing member to which liquid droplets by blank discharge are landed in the blank discharge receiver 94. The cleaner cam 128 is for swinging the wiper cleaner 118.

The caps 92 are caused to move up and down by the cap cams 122A and 122B. The wiper blade 93 is moved up and down by the wiper cam 124 so that the wiper cleaner 118 moves forward when the wiper blade moves down. Then, the wiper blade 93 is sandwiched between the cleaner roller 96 and the wiper cleaner 96 of the blank discharge cleaner 94, and, thereby, a recording liquid (ink) adhering to the wiper blade 93 is scratched off to the blank discharge receiver 94.

The carriage lock 115 is urged upward (a lock direction) by a compression spring (not shown in the figure), and is moved up and down via the carriage lock arm 117 driven by the carriage lock cam 125.

In order to rotationally drive the tubing pump 120 and the cam shaft 121, a pump gear 133 provided to a pump shaft 120*a* of the tubing pump 120 is brought into engagement with a motor gear 132 pro vided to a motor shaft 131*a* of the motor 131, and an intermediate gear 134 integrated with the pump gear 133 is engaged with an intermediate gear 136 having a one-way clutch 137 via an intermediate gear 135, and further an intermediate gear 138 having the same shaft with the intermediate gear 136 is engaged with a cam gear 140 fixed to the cam shaft 121 via an intermediate gear 139. It should be noted that an intermediate shaft 141, which is a rotational axis of the intermediate gears 136 and 138 having the clutch 137, is rotatably supported by the frame 111.

The cam shaft 121 is provided with a home position sensor cam 142 for detecting a home position. When a home position sensor (not shown in the figure) provided in the subsystem 91 detects that the caps 92 reach a lowermost end, a home position lever (not shown in the figure) is operated so that the sensor is open, thereby detecting a home position of the motor 131 (other than the pump 120). It should be noted that when a power is on, the position detection is not performed irrespective of a position of the caps 92 (the cap holders 112), and it moves to the lowermost end by moving a predetermined distance after detecting the home position of the caps 92 (during upward movement). Thereafter, the carriage is moved leftward and rightward and returns to a cap position after the position detection, and the recording heads are capped.

Figure 7:
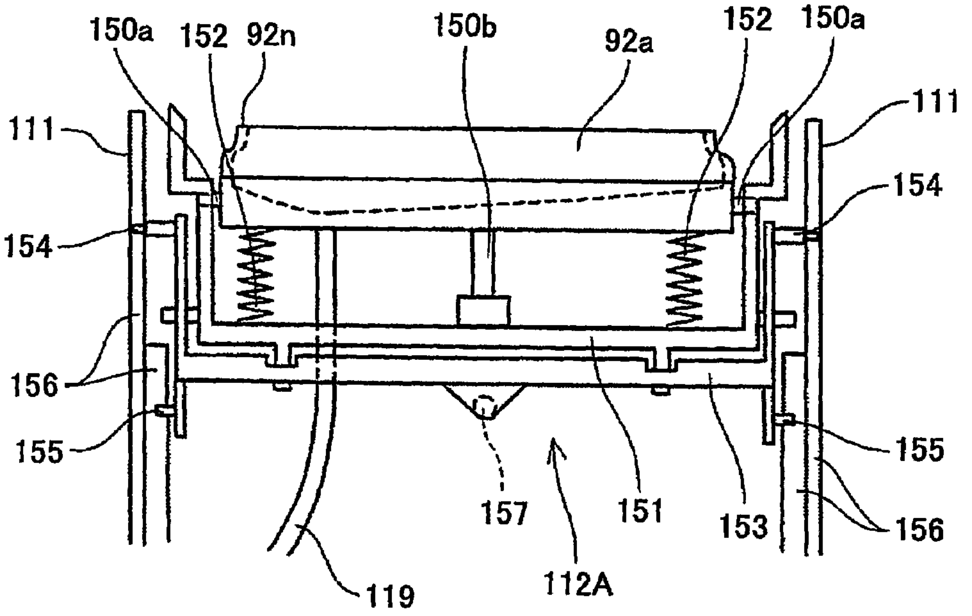
FIG. 7 is a side view of a cap supporting and vertically moving mechanism part.
Figure 8:
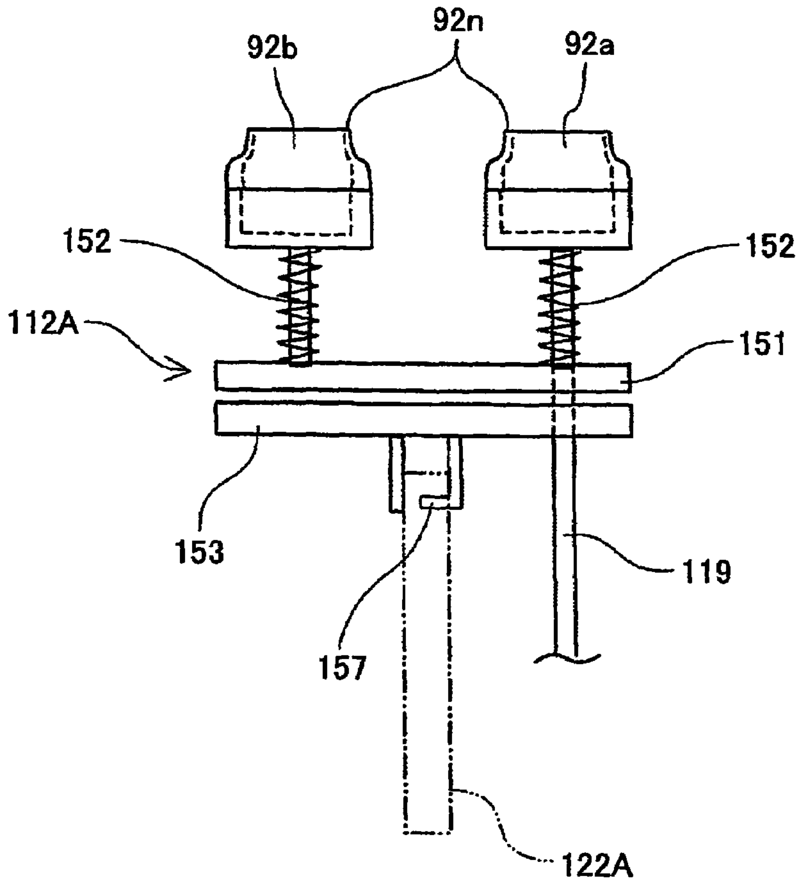
FIG. 8 is a front view of the cap supporting and vertically moving mechanism part.

A description will now be given, with reference to FIG. 7 and FIG. 8, of a supporting mechanism and a vertically moving mechanism (up and down moving mechanism) of the caps 92. FIG. 7 is a side view of a cap supporting and vertically moving mechanism part. FIG. 8 is a front view of the cap supporting and vertically moving mechanism part.

The cap holder 112A, which serves as a cap supporting mechanism, comprises: a holder 151 for movably supporting the caps 92*a* and 92*b* (these may be referred to as a cap 92A) in a vertical direction; a spring 152 interposed between a bottom surface of the holder 151 and a bottom surface of the cap 92A so as to urge the cap 92A upward; and a slider 153 movably supporting the holder 151 forward and backward (in a direction of arrangement of the nozzles of the recording heads 34).

The cap 92A has guide pins 150*a* extending from both sides and the guide pins 150*a* are movably attached to guide grooves (not shown in the figure) of the holder 151 up and down. The cap 92A also has a guide shaft 150*b* protruding from a bottom surface thereof so that the guide shaft 150*b* is inserted into a hole of the holder 151, which allows the holder 151 to move up and down. Springs 152 interposed between the cap 92A and the cap holder 151 urge the cap 92A (the caps 92*a* and 92*b*) upward (in a direction to press the caps toward the nozzle planes when being capped).

The slider 153 has guide pins 154 and 155 on the front and rear ends thereof. The guide pins 154 and 155 are slidably fitted into guide grooves 156 formed on the frame 111 so that the slider 153, the holder 151 and the cap 92A together are movable up and down.

The solider 153 also has a cam pin 157 provided on an under surface thereof. The cam pin 157 is fitted into a cam groove (not shown in the figure) of the cap cam 122A so that the slider 153, the holder 151 and the cap 92A together are movable up and down by a rotation of the cap cam 122A which is synchronized with a rotation of the cam shaft 121 to which a rotational force of the motor 131 is transmitted.

Furthermore, the slider 153 and the electrode holder 151 are inserted into the suction cap 92*a*, and a tube 119 is connected to the cap 92*a* from underneath the center of the cap with respect to a transverse direction of the cap 92*a*.

It should be noted that the cap holder 112B supporting the caps 92*c* and 92*d* (these may be together referred to as a cap 92B) and a structure for moving the cap 92B are the same as that mentioned above, and descriptions thereof will be omitted. However, unlike the cap 92*a*, the tube 119 is not connected to the caps 92*c* and 92*d*.

Thus, the cam shaft, which is one axis, is rotated by driving the motor 131, which is one drive-power source, and the cams 122A and 122B fixed to the cam shaft 121 is rotated by the rotation of the cam shaft 121, which results in the caps 92A and 9B moving up and down.

Figure 9:
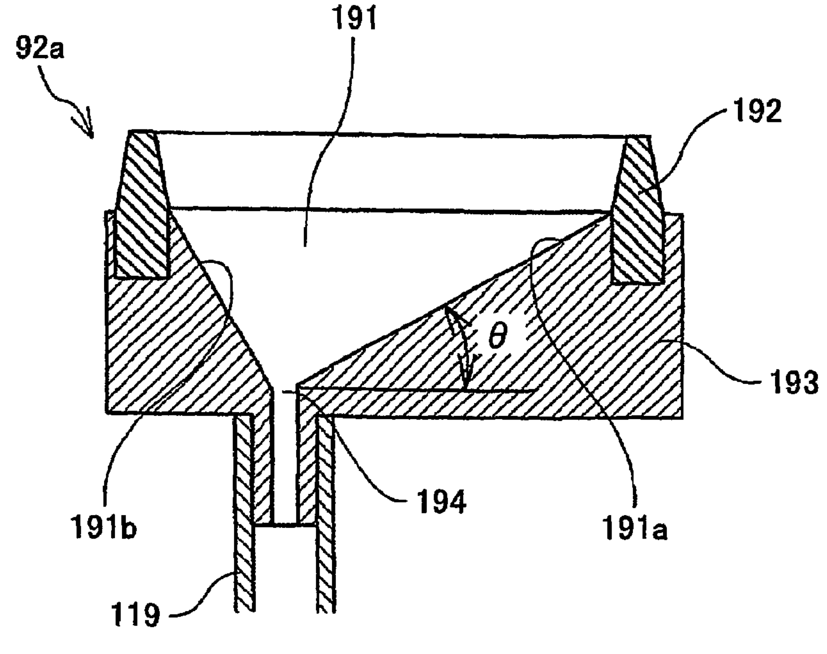
FIG. 9 is a cross-sectional view of an example of a cap member.

Here, the suction cap 92*a* is constituted by, as shown in FIG. 9, a contact member 192 and a recess forming member 193. The contact member 192 is made of a resilient material and is brought into contact with nozzle plane of the head. The recess forming member 193 supports the contact member 192 and has a recessed part 191, which receives a recording liquid (ink) discharged or suctioned from the nozzles. The contact member 192 is formed by a resilient material such as isobutylene isoprene rubber, silicone rubber, fluorine rubber, EPDM, a styrene base elastomer, etc. The recess forming member 193 is formed of a rigid material such as HDPE, PP, PTFE, etc.

A first inclined surface 191*a* and a second inclined surface 191*b*, which incline toward an evacuation port 194, are formed on a bottom surface of the recessed part 191 of the recess forming member 193. In this case, an inclination angle θ of the first inclined surface 191*a* with respect to the horizontal plane is set to be smaller than an inclination angle of the second inclined surface 191*b* with respect to the horizontal plane. The inclination angle θ and the material of the recess forming member 193 are selected so that a sum of the inclination angle θ of the first inclined surface 191*a* with respect to the horizontal plane and a contact angle of the material forming the first inclined surface with respect to the recording liquid (ink) is equal to or greater than 70 degrees. It should be noted that when the first inclined surface 191*a* and the recess forming member 193 are formed by different materials such as applying a different material onto the bottom surface of the recess forming material 193, a sum of the inclination angle θ of the first inclined surface and a contact angle of the material forming the first inclination angle with respect to the recording liquid (ink) is set to be equal to or grater than 70 degrees.

Thus, by providing the two inclined surfaces that incline toward the evacuation port on the bottom portion of the cap member and setting the sum of the inclination angle with respect to the horizontal plane and the contact angle of the material forming the inclined surface with respect to the recording liquid to 70 degrees, a residual amount of the recording liquid discharged into the cap member can be reduced even if the recoding liquid contains water, a pigment, a polymer component and a water soluble solvent wherein the pigment is contained in the recording liquid by equal to or more than 6 weight percent, and a viscosity of the recording liquid at 25° C. is equal to or larger than 20 cps and a surface tension of the recording liquid is 40 dyne/cm.

That is, by using the recording liquid containing water, a pigment, a polymer component and a water soluble solvent wherein the pigment is contained in the recording liquid by equal to or more than 6 weight percent, and a viscosity of the recording liquid at 25° C. is equal to or larger than 20 cps and a surface tension of the recording liquid is 40 dyne/cm, it is possible to form a clear image having less blur with respect to a regular paper and having high intensity.

However, in a case where such a recording liquid (ink) is used, when a suction from a nozzle is carried out as a part of a maintenance and recovery operation while capping the nozzle plane by the suction cap, a flowability of the recording liquid toward the suction port (evacuation port) in the cap member is reduced, which results in an amount of the recording liquid (ink) remaining in the cap member tends to be increased. Furthermore, since the viscosity of the recording liquid (ink) is remarkably increased beyond comparison with dye ink due to slightly dried during printing, which creates a condition in which the recording liquid tends to remain in the cap member. The recording liquid (ink) remaining in the cap member contains an amount of water less than that of the original recording liquid. Accordingly, it was newly found that if the nozzle plane is capped for a long time, the viscosity of the recording liquid (ink) in a nozzle meniscus part is increased due to water being removed from the recording liquid (ink) in the nozzle meniscus part, which results in a problem in that the nozzle cannot discharge the recording liquid.

Then, by using the cap member having the structure according to the present invention, the above-mentioned problems can be eliminated even if the recording liquid containing water, a pigment, a polymer component and a water soluble solvent wherein the pigment is contained in the recording liquid by equal to or more than 6 weight percent, and a viscosity of the recording liquid at 25° C. is equal to or larger than 20 cps and a surface tension of the recording liquid is 40 dyne/cm.

Figure 10:
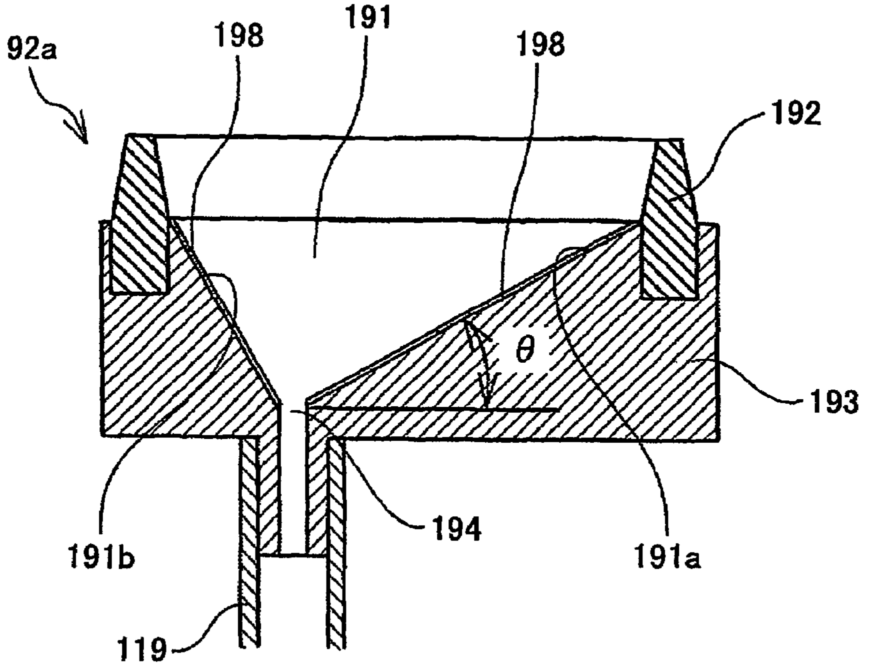
FIG. 10 is a cross-sectional view of another example of the cap member.
Figure 11:
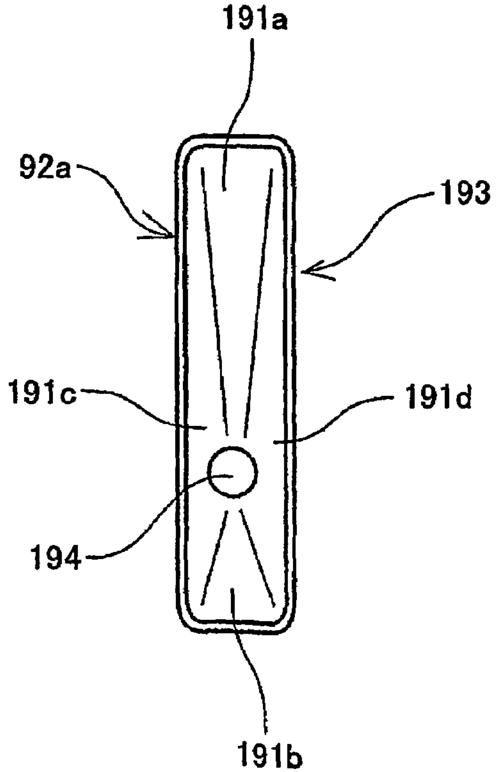
FIG. 11 is a cross-sectional view of a further example of the cap member.

As another example of the cap 92*a*, a water repellent layer 198 made of a water repellent material such as a silicon base material or a fluorine base material may be formed on the first inclined surface 191*a* and a second inclined surface 191*b* as shown in FIG. 10. Thus, by applying a water repellent treatment to at least a portion of the inner surface of the recessed part of the cap, a contact angle with respect to a recording liquid is increased, which increases a sum of the inclination angle of the inclined surface of the cap and the contact angle with respect to the recording liquid. Thus, the ranges of selection of the configuration of the cap and kinds of the recording liquid are increased.

Additionally, a remaining amount of the recording liquid (ink) can be further decreased since the recording liquid is led toward the evacuation port at which a negative pressure is high when suctioning the recording liquid by a negative pressure through the evacuation port 194 by forming inclined surfaces 191*a*-191*d* that incline continuously from four sides toward the evacuation port 194 in the recess forming member 193 of the cap 92*a* so as to make a configuration that a cross section of the opening is continuously decreased toward the evacuation port 194 and the recording liquid flows toward the evacuation port 194.

Further, by integrally forming the contact member 192 and the recess forming member 193, a cap pressure is applied sufficiently which results in an improved tight contact, thereby achieving a positive suction.

A description will be given below in more detail.

First, a plurality of cap members having different inclination angles were fabricated as the cap member 92*a*. The contact member 192 was made of a styrene base elastomer, and the recess forming member 193 was made of polypropylene. Additionally, some cap members were not subjected to a water repellent treatment on the inner surface of the recess forming member 193, and some cap members were subjected to a silicone base water repellent treatment on the inner surface of the recess forming member 193.

Then, each cap member was attached to an inkjet recording apparatus (Ipsio 505 (trade name)), and printing was performed using the following ink sets 1, 2, and 3 as ink (recording liquid). After performing a recovery operation by suctioning while capping the nozzle plane by each cap member, a remaining amount (weight) of ink in the cap member and an injecting property were investigated.

A description will be given of the ink used in the experiments.

<Adjustment of Pigment Dispersing Element>

(1) Cyan

Adjustment of a dispersing element of phtalocyanine pigment containing polymer.

The example 3 disclosed in Japanese Laid-Open Patent Application 2001-139849 was checked and a blue polymer particle dispersing element was prepared. The average particle diameter (D50%) measured according to micro track UPA of polymer particles was 93 nm.

(2) Magenta

Adjustment of a dispersing element of dimethyle quinacridone pigment containing polymer.

A magenta polymer particle dispersing element was prepared in the same manner as the above mentioned (1) except for the phtalocyanine pigment being replaced by a pigment red 122. The average particle diameter (D50%) measured according to micro track UPA of polymer particles was 127 nm.

(3) Yellow

Adjustment of a dispersing element of monoazo yellow pigment containing polymer.

A yellow polymer particle dispersing element was prepared in the same manner as the above mentioned (1) except for the phtalocyanine pigment being replaced by a pigment yellow 74. The average particle diameter (D50%) measured by micro track UPA of a polymer particle was 76 nm.

4) Black

Adjustment of a dispersing element of carbon black pigment containing polymer

A black polymer particle dispersing element was prepared in the same manner as the above mentioned (1) except for the phtalocyanine pigment being replaced by a carbon black (FW100 (trade name) manufactured by TEGSA company). The average particle diameter (D50%) measured by micro track UPA of a polymer particle was 104 nm.

A description will be given of the adjustment of ink. It should be noted that an amount of each component in the following prescription of the ink is based on weight.

<Ink Set 1>

The ink composite of the following prescription was prepared, and adjusted by 10% water solution of oxidization lithium so that a pH value is set to 9. Thereafter, filtering was performed using a membrane filter of an average pore diameter of 0.8 μm, and ink composites of cyan, magenta, yellow and black were obtained. A surface tension of each ink was 30 to 34 dyne/cm, and a viscosity was 8 to 9 cps (25° C.).

The above-mentioned each color pigment dispersing element: 8.0 wt % (as a solid component)

1,3-butane diol: 22.5 wt % glycerol: 7.5 Wt %

2-pirrolidone: 2.0 wt %

R: C12, n=9 in the general formula R—$(OCH_2CH_2)$ nOH(R is a carbon chain with a carbon number of 6 to 14 that can be branched, n: 5 to 20): 2.0 wt %

2-ethyl-1,3-hexane diol: 2.0 wt %

FT-110 (manufactured by NEOS CO., LTD.): 0.5 wt % proxel LV (antiseptic agent): 0.2 wt % ion exchange water: residual amount

<Ink Set 2>

The ink composite of the following prescription was prepared, and adjusted by 10% water solution of oxidization lithium so that a pH value is set to 9. Thereafter, filtering was performed using a membrane filter of an average pore diameter of 0.8 μm, and ink composites of cyan, magenta, yellow and black were obtained. A surface tension of each ink was 32 to 36 dyne/cm, and a viscosity was 2 to 3 cps (25° C.).

The above-mentioned each color pigment dispersing element: 4.0 wt % (as a solid component)

diethylene grycol: 15.0 wt % glycerol: 5.0 wt %

2-pirrolidone: 2.0 wt %

ECTD-3NEX (anion based surfactant manufactured by NIKKO CHEMICALS): 1.0 wt %

2-ethyl-1,3-hexane diol: 2.0 wt % emulsion: 3.0 wt % proxel LV (antiseptic agent): 0.2 wt % ion exchange water: residual amount

<Ink Set 3>

Ipsio JET300 ink (manufactured by RICOH CO., LTD) was used as a commercially available dye ink. The surface tension of the ink was 29 to 32 dyne/cm, and the viscosity was 2.1 to 2.4 cps.

Here, the following Tables 1 through Table 3 indicate a type of each of the above-mentioned caps, the inclination angle, the contact angle with respect to the ink of each of the ink sets, a sum of the inclination angle and the contact angle.

TABLE 1

| SUCTION CAP TYPE | INCLINE ANGLE θ (deg) | WATER REPELLENT PROCESS | CONTACT ANGLE (deg) INK SET 1 | θ + CONTACT ANGLE (deg) |
|---|---|---|---|---|
| A | 35 | NO | 55 | 90 |
| B | 35 | YES | 62 | 97 |
| C | 30 | NO | 55 | 85 |
| D | 30 | YES | 62 | 92 |
| E | 25 | NO | 55 | 80 |
| F | 25 | YES | 62 | 87 |
| G | 20 | NO | 55 | 75 |
| H | 20 | YES | 62 | 82 |
| I | 15 | NO | 55 | 70 |
| J | 15 | YES | 62 | 77 |
| K | 10 | NO | 55 | 65 |
| L | 10 | YES | 62 | 72 |
| M | 5 | NO | 55 | 60 |
| N | 5 | YES | 62 | 67 |

TABLE 2

| SUCTION CAP TYPE | INCLINE ANGLE θ (deg) | WATER REPELLENT PROCESS | CONTACT ANGLE (deg) INK SET 2 | θ + CONTACT ANGLE (deg) |
|---|---|---|---|---|
| A | 35 | NO | 56 | 91 |
| B | 35 | YES | 64 | 99 |
| C | 30 | NO | 56 | 86 |
| D | 30 | YES | 64 | 94 |
| E | 25 | NO | 56 | 81 |
| F | 25 | YES | 64 | 89 |
| G | 20 | NO | 56 | 76 |
| H | 20 | YES | 64 | 84 |
| I | 15 | NO | 56 | 71 |
| J | 15 | YES | 64 | 79 |
| K | 10 | NO | 56 | 66 |
| L | 10 | YES | 64 | 74 |
| M | 5 | NO | 56 | 61 |
| N | 5 | YES | 64 | 69 |

TABLE 3

| SUCTION CAP TYPE | INCLINE ANGLE θ (deg) | WATER REPELLENT PROCESS | CONTACT ANGLE (deg) INK SET 3 | θ + CONTACT ANGLE (deg) |
|---|---|---|---|---|
| A | 35 | NO | 72 | 107 |
| B | 35 | YES | 83 | 118 |
| C | 30 | NO | 72 | 102 |
| D | 30 | YES | 83 | 113 |
| E | 25 | NO | 72 | 97 |
| F | 25 | YES | 83 | 108 |
| G | 20 | NO | 72 | 92 |
| H | 20 | YES | 83 | 103 |
| I | 15 | NO | 72 | 87 |
| J | 15 | YES | 83 | 98 |
| K | 10 | NO | 72 | 82 |
| L | 10 | YES | 83 | 93 |
| M | 5 | NO | 72 | 77 |
| N | 5 | YES | 83 | 88 |

A description will be given of the result of tests. The suction cap of the above-mentioned device is replaced by each type of the suction cap, and printing of 2,000 sheets/day was performed. A state of injection was checked using a nozzle check pattern every five days (10,000 sheets printing), and a weight of the suction cap was checked every day. If there was a nozzle which did not discharge the ink, a cleaning operation was performed one time, and investigated if it was recovered. The above-mentioned investigation was performed using each of the ink sets 1, 2 and 3.

The following Table 4 indicates the result of investigation using the ink set 1. Table 5 indicates the result of investigation using the ink set 2. Table 6 indicates the result of investigation using the ink set 3. It should be noted that, in each table, the amount of ink represents a weight of the ink adhering on the cap. Additionally, O is given when there was no nozzle that does not discharge, is given when there was a nozzle that did not discharge, O is given when the nozzle that did not discharge was recovered, and is given when the nozzle that did not discharge was not recovered.

TABLE 4

| SUCTION CAP TYPE | AMOUNT OF INK (g) | UNDISCHARGING NOZZLE | RECOVERY | AMOUNT OF INK (g) | UNDISCHARGING NOZZLE | RECOVERY |
|---|---|---|---|---|---|---|
| | AFTER 10,000 SHEETS | | | AFTER 20,000 SHEETS | | |
| A | 0.02 | ○ | — | 0.02 | ○ | — |
| B | 0.02 | ○ | — | 0.02 | ○ | — |
| C | 0.02 | ○ | — | 0.02 | ○ | — |
| D | 0.02 | ○ | — | 0.02 | ○ | — |
| E | 0.03 | ○ | — | 0.04 | ○ | — |
| F | 0.02 | ○ | — | 0.02 | ○ | — |
| G | 0.04 | ○ | — | 0.05 | ○ | — |
| H | 0.02 | ○ | — | 0.03 | ○ | — |
| I | 0.04 | ○ | — | 0.05 | ○ | — |
| J | 0.04 | ○ | — | 0.05 | ○ | — |
| K | 0.05 | X | ○ | 0.08 | X | ○ |
| L | 0.04 | ○ | — | 0.05 | ○ | — |
| M | 0.17 | X | ○ | 0.20 | X | X |
| N | 0.04 | ○ | — | 0.08 | X | ○ |
| | AFTER 30,000 SHEETS | | | AFTER 50,000 SHEETS | | |
| A | 0.02 | ○ | — | 0.02 | ○ | — |
| B | 0.02 | ○ | — | 0.02 | ○ | — |

TABLE 4-continued

| SUCTION CAP TYPE | AMOUNT OF INK (g) | UNDISCHARGING NOZZLE | RECOVERY | AMOUNT OF INK (g) | UNDISCHARGING NOZZLE | RECOVERY |
|---|---|---|---|---|---|---|
| C | 0.03 | ○ | — | 0.03 | ○ | — |
| D | 0.02 | ○ | — | 0.02 | ○ | — |
| E | 0.05 | ○ | — | 0.06 | ○ | — |
| F | 0.02 | ○ | — | 0.03 | ○ | — |
| G | 0.07 | ○ | — | 0.09 | X | ○ |
| H | 0.03 | ○ | — | 0.04 | ○ | — |
| I | 0.08 | X | ○ | 0.12 | X | ○ |
| J | 0.06 | ○ | — | 0.08 | X | ○ |
| K | 0.21 | X | X | 0.35 | X | X |
| L | 0.06 | ○ | — | 0.07 | X | ○ |
| M | 0.34 | X | X | 0.63 | X | X |
| N | 0.12 | X | ○ | 0.13 | X | X |

TABLE 5

| SUCTION CAP TYPE | AMOUNT OF INK (g) | UNDISCHARGING NOZZLE | RECOVERY | AMOUNT OF INK (g) | UNDISCHARGING NOZZLE | RECOVERY |
|---|---|---|---|---|---|---|
| | AFTER 10,000 SHEETS | | | AFTER 20,000 SHEETS | | |
| A | 0.01 | ○ | — | 0.01 | ○ | — |
| B | 0.01 | ○ | — | 0.01 | ○ | — |
| C | 0.01 | ○ | — | 0.02 | ○ | — |
| D | 0.01 | ○ | — | 0.01 | ○ | — |
| E | 0.02 | ○ | — | 0.03 | ○ | — |
| F | 0.01 | ○ | — | 0.02 | ○ | — |
| G | 0.02 | ○ | — | 0.03 | ○ | — |
| H | 0.01 | ○ | — | 0.02 | ○ | — |
| I | 0.03 | ○ | — | 0.03 | ○ | — |
| J | 0.02 | ○ | — | 0.02 | ○ | — |
| K | 0.02 | ○ | — | 0.02 | ○ | — |
| L | 0.02 | ○ | — | 0.02 | ○ | — |
| M | 0.04 | ○ | — | 0.08 | X | X |
| N | 0.03 | ○ | — | 0.03 | ○ | — |
| | AFTER 30,000 SHEETS | | | AFTER 50,000 SHEETS | | |
| A | 0.01 | ○ | — | 0.01 | ○ | — |
| B | 0.01 | ○ | — | 0.01 | ○ | — |
| C | 0.02 | ○ | — | 0.02 | ○ | — |
| D | 0.01 | ○ | — | 0.01 | ○ | — |
| E | 0.03 | ○ | — | 0.04 | ○ | — |
| F | 0.02 | ○ | — | 0.02 | ○ | — |
| G | 0.04 | ○ | — | 0.05 | ○ | — |
| H | 0.02 | ○ | — | 0.02 | ○ | — |
| I | 0.04 | ○ | — | 0.05 | X | ○ |
| J | 0.02 | ○ | — | 0.02 | X | ○ |
| K | 0.02 | ○ | — | 0.02 | X | X |
| L | 0.02 | ○ | — | 0.03 | X | ○ |
| M | 0.12 | X | ○ | 0.13 | X | X |
| N | 0.03 | ○ | — | 0.04 | X | ○ |

TABLE 6

| SUCTION CAP TYPE | AMOUNT OF INK (g) | UNDISCHARGING NOZZLE | RECOVERY | AMOUNT OF INK (g) | UNDISCHARGING NOZZLE | RECOVERY |
|---|---|---|---|---|---|---|
| | AFTER 10,000 SHEETS | | | AFTER 20,000 SHEETS | | |
| A | 0.01 | ○ | — | 0.01 | ○ | — |
| B | 0.01 | ○ | — | 0.01 | ○ | — |
| C | 0.01 | ○ | — | 0.01 | ○ | — |
| D | 0.01 | ○ | — | 0.01 | ○ | — |
| E | 0.01 | ○ | — | 0.01 | ○ | — |
| F | 0.01 | ○ | — | 0.01 | ○ | — |
| G | 0.01 | ○ | — | 0.01 | ○ | — |
| H | 0.01 | ○ | — | 0.01 | ○ | — |
| I | 0.01 | ○ | — | 0.01 | ○ | — |
| J | 0.01 | ○ | — | 0.01 | ○ | — |

TABLE 6-continued

| SUCTION CAP TYPE | AMOUNT OF INK (g) | UNDISCHARGING NOZZLE | RECOVERY | AMOUNT OF INK (g) | UNDISCHARGING NOZZLE | RECOVERY |
|---|---|---|---|---|---|---|
| K | 0.01 | ○ | — | 0.01 | ○ | — |
| L | 0.01 | ○ | — | 0.01 | ○ | — |
| M | 0.02 | ○ | — | 0.02 | ○ | — |
| N | 0.02 | ○ | — | 0.02 | ○ | — |
| | AFTER 30,000 SHEETS | | | AFTER 50,000 SHEETS | | |
| A | 0.01 | ○ | — | 0.01 | ○ | — |
| B | 0.01 | ○ | — | 0.01 | ○ | — |
| C | 0.01 | ○ | — | 0.01 | ○ | — |
| D | 0.01 | ○ | — | 0.01 | ○ | — |
| E | 0.01 | ○ | — | 0.01 | ○ | — |
| F | 0.01 | ○ | — | 0.01 | ○ | — |
| G | 0.01 | ○ | — | 0.01 | ○ | — |
| H | 0.01 | ○ | — | 0.01 | ○ | — |
| I | 0.01 | ○ | — | 0.01 | ○ | — |
| J | 0.01 | ○ | — | 0.01 | ○ | — |
| K | 0.01 | ○ | — | 0.01 | ○ | — |
| L | 0.01 | ○ | — | 0.01 | ○ | — |
| M | 0.02 | ○ | — | 0.02 | ○ | — |
| N | 0.02 | ○ | — | 0.02 | ○ | — |

It is appreciated from the above Tables 4 through 6 that if the sum of the inclination angle θ of the cap and the contact angle of the material that forms the inclined surface (hereinafter, referred to as a sum of the inclination angle and the contact angle) is equal to or larger than 70 degrees, the nozzle that did not discharge was recovered by the cleaning operation (recovery operation) eve after printing of 50,000 sheets. It should be noted that although when the ink set 2 of the Table 5 was used, there is the result that a recovery was made for the nozzle that did not discharge for the cap of N type after printing of 50,000 sheets, it is preferable that the sum of the inclination angle θ and the contact angle is equal to or larger than 70 degrees.

Moreover, it was confirmed that if the sum of the inclination angle θ and the contact angle is equal to or larger than 75 degrees, there is no nozzle that does not discharge the ink (from the difference between type G of Table 4 and type G of Table 5). Especially, it can be appreciated that if the sum of the inclination angle θ and the contact angle is equal to or larger than 90 degrees, the suctioned ink tends to fall along the inclined surface and is led to the evacuation port and there is less amount of ink in the cap and there is no blank nozzle generated for a long time of printing.

In such a case, the contact angle with respect to the ink can be increased by applying a water repellent treatment or process to an inner surface of the cap. Thus, the sum of the inclination angle and the contact angle is increased, which increases ranges of configuration of the cap and kinds of ink.

It should be noted that the present invention is applicable also to an image forming apparatuses such as a facsimile apparatus, a copy apparatus or a printer/fax/copy compound machine. Moreover, the present invention is applicable also to a maintenance and recovery device of a liquid discharge apparatus that discharges a liquid other than ink, such as a resist or a DNA sample in a medical field.

The present invention is not limited to the specifically disclosed embodiments, and variations and modifications may be made without departing from the scope of the present invention.

The invention claimed is:

1. A maintenance and recovery device of a liquid droplet discharge apparatus having a liquid droplet discharge head discharging droplets of a recording liquid from a nozzle, the recording liquid containing water, pigment, a polymer component and a water-soluble organic solvent, an amount of pigment being equal to or more than 6 weight percent of the recording liquid, a viscosity of the recording liquid being equal to or higher than 5 cps and equal to or lower than 20 cps, and a surface tension of the recording liquid being equal to or smaller than 40 dyne/cm at a temperature of 25° C., the maintenance and recovery device comprising:

a suction cap member that caps a nozzle plane of the liquid droplet discharge head; and a plurality of inclined surfaces formed in said suction cap member that provide a slope toward an evacuation port on a bottom of said suction cap member from an entire circumference of an opening part of said suction cap member, each of the inclined surfaces forming an inclination angle equal to or larger than 20 degrees with respect to a horizontal plane so that a cross-sectional area of a liquid passage formed by said inclined surfaces continuously decreases from said opening part toward said evacuation port, wherein a sum of the inclination angle and a contact angle of said recording liquid with respect to a material forming said inclined surfaces is within a range from 75 degrees to 97 degrees.

2. The maintenance and recovery device of a liquid droplet discharge apparatus as claimed in claim 1, wherein said suction cap member includes a resilient member configured to be brought into contact with said nozzle plane and a bottom member having a recessed part including said inclined surface, and the resilient member and the bottom member are integrated with each other.

3. The maintenance and recovery device of a liquid droplet discharge apparatus as claimed in claim 1, wherein a water repellent treatment is applied at least a portion of an inner surface of said suction cap member.

4. An image forming apparatus comprising:

a liquid droplet discharge head as a recording head having a nozzle that discharges droplets of a recording liquid; and a maintenance and recovery device that maintains and recovers a performance of said liquid droplet discharge head, wherein said maintenance and recovery device has a liquid droplet discharge head discharging droplets of a recording liquid from a nozzle, the recording liquid contains water, pigment, a polymer component and a water-soluble organic solvent, an amount of pigment is equal to or more than 6 weight percent of the recording liquid, a viscosity of the recording liquid is equal to or higher than 5 cps and equal to or lower than 20 cps, a surface tension of the recording liquid is equal to or smaller than 40 dyne/cm at a temperature of 25° C., and the maintenance and recovery device includes:

a suction cap member that caps a nozzle plane of the liquid droplet discharge head; and a plurality of inclined surfaces formed in said suction cap member that provide slopes toward an evacuation port on a bottom of said suction cap member from an entire circumference of an opening part of said suction cap member, each of the inclined surfaces forming an inclination angle equal to or larger than 20 degrees with respect to a horizontal plane so that a cross-sectional area of a liquid passage formed by said inclined surfaces continuously decreases from said opening part toward said evacuation port, wherein a sum of the inclination angle and a contact angle of said recording liquid with respect to a material forming said inclined surfaces is within a range from 75 degrees to 97 degrees.

5. The image forming apparatus as claimed in claim 4, wherein said suction cap member includes a resilient member configured to be brought into contact with said nozzle plane and a bottom member having a recessed part including said inclined surface, and the resilient member and the bottom member are integrated with each other.

6. The image forming apparatus as claimed in claim 4, wherein a water repellent treatment is applied at least a portion of an inner surface of said suction cap member.

* * * * *